July 13, 1948.  F. RODWICK  2,445,086
CERAMIC HEATING PLATE CONSTRUCTION
Filed July 13, 1944
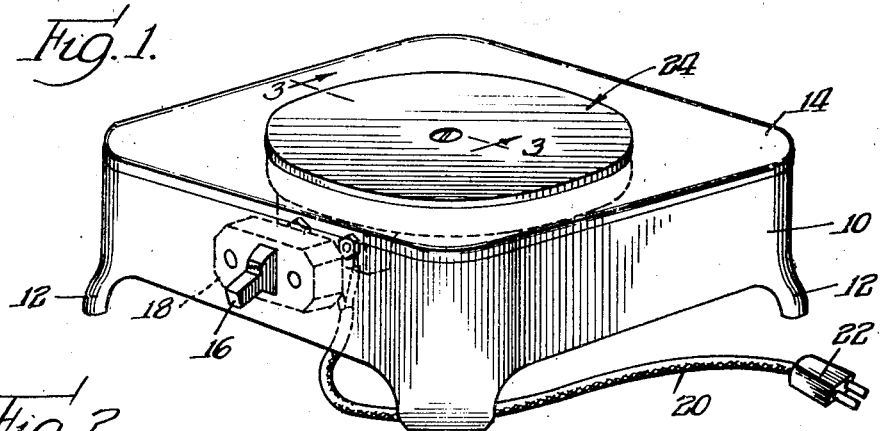
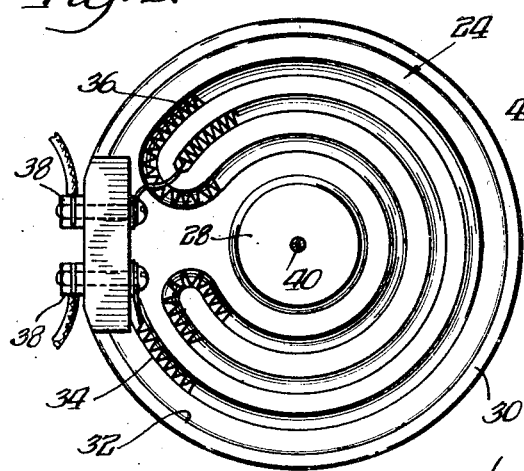
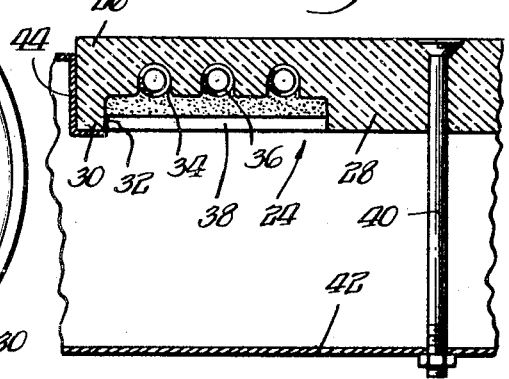
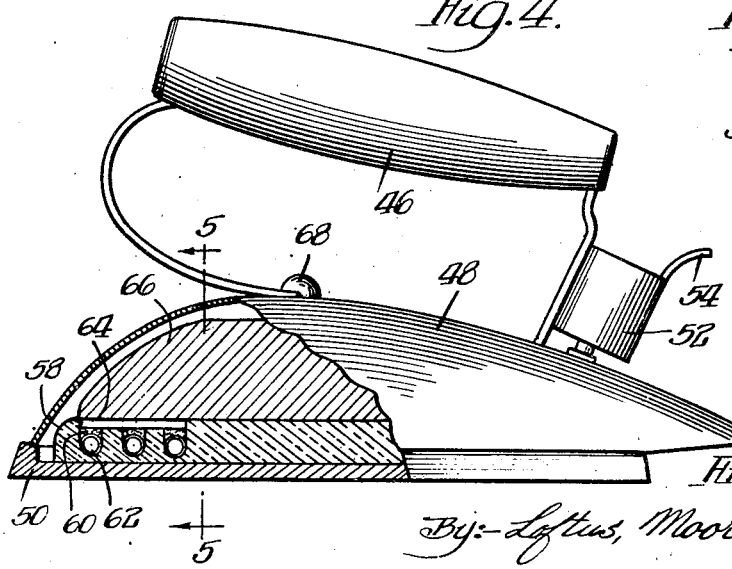
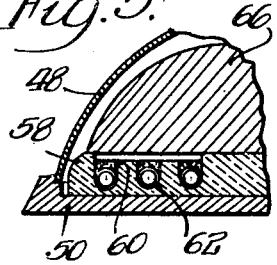
INVENTOR.
Frank Rodwick
By:- Loftus, Moore, Olson & Trexler
attys.

Patented July 13, 1948

2,445,086

UNITED STATES PATENT OFFICE 2,445,086

CERAMIC HEATING PLATE CONSTRUCTION

Frank Rodwick, Chicago, Ill., assignor to Chicago Electric Manufacturing Company, Chicago, Ill., a corporation of Illinois Application July 13, 1944, Serial No. 544,752

1 Claim. (Cl. 219—37)

The present invention relates to electric heating elements and more particularly to an electric heating element having an insulated surface adapted to be engaged by a member to be heated.

Heretofore in the manufacture of hot plates or stoves, it has been common to provide a ceramic frame having a plurality of ridges or bars for supporting an open coiled resistance wire network which is to be heated by current flowing through the wire. While such arrangements are relatively simple to construct and hence are particularly suited for the production of low cost heating units for hot plates or stoves of the type commonly used with the smaller sizes of cooking utensils or coffee makers, they have certain disadvantages. The open wire network presents a hazard due to accidental contact with the wire, particularly at the time when the electricity is first turned on and the wire has not yet become sufficiently heated to serve as a warning. Such open networks may become partially short circuited when liquid is spilled on the heating element, and they are difficult to clean. The open network has a further disadvantage of not evenly distributing the heat and being subject to considerable heat loss through convection currents of air. It, therefore, would be desirable to provide a heating element wherein electrical resistance wire is not exposed and without the use of the more expensive structures such as the metal encased heating unit having a wire embedded in a powdered insulating material.

In accordance with the present invention an electrical heating unit having its resistance wire completely enclosed is formed of a ceramic member having a surface adapted to be engaged by the member to be heated so that a better distribution of heat is obtained and no losses are introduced by air convection currents.

It, therefore, is an object of the present invention to provide an improved electric heating unit for electrical appliances such as stoves, hot plates, and flat irons which is relatively simple and economical to manufacture.

It is another object of the present invention to provide an improved electric heating unit for electrical appliances having completely enclosed electric resistance heating wire which is simple and economical to manufacture.

Still another object of the present invention is to provide an improved electric heating element for electrical appliances having a surface formed of insulating material which is adapted to directly contact a member to be heated.

Other and further objects of the present invention subsequently will become apparent by reference to the following description taken in connection with the accompanying drawing wherein Figure 1 is a perspective view of an electric stove or hot plate embodying the heating element constructed in accordance with the present invention;

Figure 2 is a bottom view of the heating element or unit prior to the time that a ceramic cement is applied to enclose the electric resistance wire;

Figure 3 is a partial cross sectional view through the heating element shown in Figure 1 as seen along the lines 3—3;

Figure 4 shows the application of the present invention to the construction of an electric flat iron partially broken away to show the construction of the heating element; and Figure 5 is a partial view in cross section of the device shown in Figure 4 as seen in the direction of the arrows along the line 5—5.

Referring to the drawing and more particularly to Figures 1, 2 and 3, there is shown an electric stove or hot plate having a base 10 stamped on a sheet of metal so as to have four legs 12, and arranged to support a top plate member 14. The base member 10 at the front of the appliance may be provided with a suitable aperture for receiving the switch lever 16 of an off and on electric switch 18 mounted on the inside of one of the walls of the base 10. The switch 18 is interposed between a suitable electric cord 20 having a plug 22, and an electric heating element or unit 24 supported centrally within the top plate 14. Preferably the electrical heating unit 24 is circular in shape having a flat top surface which extends slightly above the surface of the top metal plate 14.

From Figures 2 and 3, it will be seen that the heating element 24 is composed of a ceramic member 26 having a solid central portion 28 and solid side wall portions 30. Between the central portion 28 and the side walls 30, there is provided an annular recess 32 having at the bottom thereof a folded groove 34 preferably having a rounded bottom shape. Positioned within the groove 34 is an electrical resistance wire 36 of the helically wound type which is connected between suitable binding posts 38. The binding posts 38 are interconnected with the switch 18 and an electric cord 20. The recess 32 and the remaining portions of the groove 34 after the electric resistance wire 36 has been placed in position are covered with a ceramic cement 38 which preferably has a thermosetting characteristic and which has a temperature coefficient equal to that of the ceramic body 26. Preferably the cement 38 completely fills the annular recess 32. The heating unit 24 is provided with a central aperture for receiving a fastening bolt 40 which extends through a bottom cover plate 42 adapted to engage suitable inwardly turned flanges adjacent the bottom edge of the wall or apron of the supporting structure 10. The upper plate surface 14 adjacent the periphery of the heating element 24 is formed so as to provide a supporting ledge 44 for engaging the portion 30 of the ceramic member 26. It will be noted that the grooves 34 are so positioned as to be relatively close to the top surface of the ceramic member 26 so that heat is readily conducted through the ceramic to the top surface which is in engagement with a member or utensil which is to be heated.

By referring to Figures 4 and 5 it will be seen how an electric heating element or unit of the ceramic type similar to that shown in Figures 1 to 3 may be used in an electric flat iron. There is shown in these figures a flat iron having a handle 46 suitably supported above an outer cover 48 extending above the ironing plate or shoe 50. Adjacent the back end of the handle 46 a suitable guard 52 may be provided about the prongs for receiving an electric iron plug attached to a cord. The guard 52 may have a rearwardly extending portion 54 which together with a rearwardly extending portion 56 formed on the cover 48 serves as a stand for holding the iron on its end. From the broken away portion of Figure 4 taken in conjunction with the partial cross sectional view of Figure 5, it will be seen on the inside immediately adjacent the bed plate or shoe 50 there is a ceramic member 58 having therein a groove 60 which may be folded back and forth so as to receive a coil resistance heating wire 62. The heating wire 62 is covered by a ceramic cement 64 filling the grooves 60 so as to present a generally level top surface for the ceramic member 58 upon which is placed a weight 66. The ceramic member 58 and the weight 66 are retained in position by a stud bolt or other fastening means as is customary in the construction of electric flat irons. This same stud bolt may be provided with a cap nut 68 for retaining in position the cover 48 and the handle 46.

From the application of the invention to an electric flat iron as shown in Figures 4 and 5, it again becomes apparent than an electrical heating element comprising a ceramic supporting frame having therein grooves and an electric resistance wire in the grooves has a surface in engagement with the member which is to be heated, which in the instance of the flat iron is the bed plate or shoe 50. The electrical resistance wire 62 is connected by suitable conductors to the plugs enclosed by the protective shield 52.

It will also be noted in Figures 4 and 5 that an air space is located between the upper surface of the ceramic cement 64 and the lower surface of the weight 66. This supplies an insulating area and serves to facilitate concentration of heat delivery into the shoe 50.

While for the purpose of describing and illustrating the present invention, certain specific embodiments have been disclosed as applied to an electric stove or hot plate, and an electric flat iron, it is to be understood that the invention is susceptible of other configurations and embodiments conforming to the particular application to be made, that the present disclosure is not to be construed as a limitation of the invention since obviously such variations and modifications are intended as may be commensurate with the spirit and scope of the invention as set forth in the appended claim.

This invention is hereby claimed as follows:

An electric heating element comprising a heat distributing ceramic member having a flat surface adapted to be engaged by a member to be heated, said ceramic member having an opposite surface provided with a substantially round bottom groove arranged in folded manner so as to cover a substantial portion of the area of said ceramic member and having shoulder portions encompassing a plurality of the groove folds, said groove extending to a depth sufficient to place a heating element in said groove in close proximity to said flat surface, a helical electric resistance heating wire positioned within said groove, and a thermosetting cement having a coefficient of expansion similar to that of said ceramic member, said cement covering said helical wire and substantially filling the space between said shoulder portions to retain said wire in place.

FRANK RODWICK.

REFERENCES CITED

The following references are of record in the file of this patent:

UNITED STATES PATENTS

| Number | Name | Date |
|---|---|---|
| 1,219,629 | Davenport | Mar. 20, 1917 |
| 1,298,421 | Thomson | Mar. 25, 1919 |
| 1,431,825 | Lemoine | Oct. 10, 1922 |
| 1,700,087 | Slade | Jan. 22, 1929 |
| 1,789,269 | Beach | Jan. 13, 1931 |
| 1,881,241 | Potensa | Oct. 4, 1932 |
| 1,938,674 | Terwilliger | Dec. 12, 1933 |
| 2,007,111 | Morgan | July 2, 1935 |
| 2,136,763 | Smith | Nov. 15, 1938 |
| 2,152,126 | Young | Mar. 28, 1939 |
| 2,179,934 | Jones | Nov. 14, 1939 |
| 2,334,222 | Schoell | Nov. 16, 1943 |